Jan. 25, 1966 M. R. KUEHNLE 3,231,685

DATA STORAGE SYSTEM RECORD DRIVE MECHANISM

Filed Jan. 9, 1961 10 Sheets-Sheet 1

MANFRED R. KUEHNLE
*INVENTOR.*

*BY*

ATTORNEY.

Jan. 25, 1966 M. R. KUEHNLE 3,231,685

DATA STORAGE SYSTEM RECORD DRIVE MECHANISM

Filed Jan. 9, 1961 10 Sheets-Sheet 2

MANFRED R. KUEHNLE
*INVENTOR.*

*BY* David A. Rich
ATTORNEY.

MANFRED R. KUEHNLE
INVENTOR.
BY David A. Rich
ATTORNEY

MANFRED R. KUEHNLE
*INVENTOR.*
*BY* David A. Rich
ATTORNEY

Jan. 25, 1966 M. R. KUEHNLE 3,231,685

DATA STORAGE SYSTEM RECORD DRIVE MECHANISM

Filed Jan. 9, 1961 10 Sheets-Sheet 5

MANFRED R. KUEHNLE
*INVENTOR.*

BY David A. Rich

ATTORNEY

Jan. 25, 1966 M. R. KUEHNLE 3,231,685

DATA STORAGE SYSTEM RECORD DRIVE MECHANISM

Filed Jan. 9, 1961

10 Sheets-Sheet 6

MANFRED R. KUEHNLE
*INVENTOR.*

BY David A. Rich

ATTORNEY.

Jan. 25, 1966 M. R. KUEHNLE 3,231,685

DATA STORAGE SYSTEM RECORD DRIVE MECHANISM

Filed Jan. 9, 1961 10 Sheets-Sheet 7

MANFRED R. KUEHNLE
*INVENTOR.*

BY David A. Rich
ATTORNEY.

MANFRED R. KUEHNLE
*INVENTOR.*
BY David A. Rich
ATTORNEY

MANFRED R. KUEHNLE
*INVENTOR.*
*BY* David A. Rich
ATTORNEY

Jan. 25, 1966 M. R. KUEHNLE 3,231,685

DATA STORAGE SYSTEM RECORD DRIVE MECHANISM

Filed Jan. 9, 1961 10 Sheets-Sheet 10

MANFRED R. KUEHNLE
*INVENTOR.*

BY David A. Rich

ATTORNEY.

United States Patent Office 3,231,685
Patented Jan. 25, 1966

3,231,685

DATA STORAGE SYSTEM RECORD DRIVE MECHANISM

Manfred R. Kuehnle, Lexington, Mass., assignor to Itek Corporation, Lexington, Mass., a corporation of Delaware Filed Jan. 9, 1961, Ser. No. 81,621
9 Claims. (Cl. 179—100.2)

This application is a continuation-in-part of my co-pending application Serial No. 30,928, filed May 23, 1960, now abandoned.

The present invention relates generally to data processing systems. More particularly the invention relates to novel data processing tape apparatus, magnetic tape recorders, graphic projection apparatus, and novel driving mechanisms associated therewith generally useful in transmission apparatus.

The term "helical" as used herein includes cylindrical, circular, or conical helices, as well as any helix like winding about an axis, open curve, or closed curve, in contradistinction to a curve that is wound on itself, e.g., Archimedes spiral.

The term "edge" as used herein defines either of the opposed narrower surfaces of a tape.

The term "toroidal" as used herein defines a true toroid, e.g., a doughnut shaped surface, as well as other toroid like endless surfaces disposed about a central axis, whether or not the central axis is, in fact, an axis of revolution or axis of symmetry.

In certain known magnetic recorders, it is customary to provide a feed reel and a takeup reel for storing the magnetic tape. In operation the tape is spirally wound on the reels. Means are also provided to strip the tape from the feed reel, move the tape past a recording or reading head at a constant speed under a constant tension, and then on to the takeup reel. The components required to accomplish the listed functions include such items as slipping clutches, to provide the required tensioning and compensation for the continuously changing diameters of the tape on the reels. The mechanism for storing and moving the tape contributes substantially to the weight and cost of known recorders. While it has been possible to reduce the size of recorders to the point where portable recorders of fairly small dimensions are practical, presently used designs cannot be produced in much smaller sizes without sacrificing, to a large measure, the length of the record, in order to obtain compensating advantages, as a corresponding reduction in the inertia of the moving parts of the recorder.

Any recorder for use in aircraft or missiles should be as light and compact as possible. The requirements of known recorders with respect to reels, tensioning devices and relatively heavy driving motors for these components makes prior art recorders heavy and bulky, and thus militates against their use in airborne applications.

In certain applications, as in recording the conversation in a communications from the cockpit of an aircraft, it is of value to have a recorder which will operate continuously even though a record of occurrences in only the last half hour before the happening of a certain event, as a casualty or crash, is of any particular interest. One known recorder for use in endless recording, incorporates a single reel in association with an endless tape. In this particular device the tape is wound on the outside of a roll and taken off from the center thereof. It is evident that, in this device, the turns of the tape must rub against each other. In addition a danger of excessive tensioning of the tape exists, if the friction between the turns on the roll exceed critical amounts.

In the prior art, devices are known utilizing recording discs, drums, belts and tapes. In contrast with discs, drums, and belt devices, no known tape recorder exhibits random access to data on a given turn of tape. In the prior art tape devices access to previously recorded data may be accomplished only by rewinding the tape, thus random access to any desired portion of the tape is not possible. In the prior tape recorders either one of the reels may be driven, as desired, to permit rewinding and replaying. However, it is noted that a substantial amount of time, e.g., two and one-half minutes, are required to rewind completely a tape on which thirty minutes recording has been impressed. In addition, since reversal of direction is required, both reels have to incorporate self-adjusting spindles. Also, when the desired portion is reached, the motor drive for the particular reel being driven is de-energized to prevent damage to either the tape or motor drive, thus requiring numerous parts adding to the weight, size, cost and complexity of the recorder.

The storage and positioning mechanism used with roll film photographic readers bears a close resemblance to the corresponding mechanism just discussed. Naturally, some differences exist between the physical characteristics of photographic film and magnetic tape, but the basic components of mechanisms for handling either type of material are similar. For example, both mechanisms incorporate feed reels, takeup reels and tensioning devices of quite similar design. Because both roll film and magnetic tape are ribbon-like materials having a plastic base with either a relatively fragile coating thereon or are merely impregnated with sensitive material. It seems intuitive that improved apparatus for handling one material will also operate, with minor obvious mechanical differences, to handle the other. It will be understood, therefore, that, unless a difference is pointed out, reference hereinafter to "tape" or "magnetic tape" will include "roll film" or "photographic film".

In one embodiment of the invention there is provided a recorder in which a novel magnetic tape is used. The tape, instead of being a flat ribbon spirally wound on a reel, as is conventional, is in the form of a helical toroid. The toroid is made by first coiling the tape on its edge in the form of a helix and then joining the two free ends of the helix. In this condition, the tape is in the form of an endless curve helically wound about a closed curve. Before the final forming, the outer edge of the helix may be serrated so as to form gear teeth. Although the serrating step is preferred for reasons to be given hereinafter, it is not an essential part of the invention. At this point, the tape is self-supporting, the turns of the helix being closer together on the inside of the toroid than at the outside. The tape is then placed over a spindle driven by a motor. If the edge of the tape has been serrated, the spindle may have a matching spiral gear mounted thereon or formed therein to provide a positive drive. Actuating the motor then causes the spindle to drive the tape. The gear teeth on each turn of the helix are engaged successively so that the tape is simultaneously driven at many points along its length. As a result, the tape rotates about the closed curve and simultaneously translates along it. Since the tape is driven at its edge by the gear, the need for feed reels and tape up reels has been eliminated. Associated with the elimination of the reels is the elimination of various components, such as constant tension devices, slipping clutches, etc., thereby resulting in a lighter weight more compact recorder. The elimination of these parts also reduces the inertia of the moving parts, thus smaller motors may be used for driving the recording medium which further contributes to the light weight and compactness of the recorder.

A magnetic recording or reading head is disposed so that its gap is adjacent to the tape at a convenient point toward the outer edge thereof. Thus, as the tape rotates around the spindle, each point on the tape passes the magnetic head. The head in turn is connected in a circuit, with any known amplifier circuit, preferably a transistorized circuit, to allow either recording or playback.

Random access, heretofore unobtainable in the prior art tape recorders is obtained by removing the head from the tape; rotating the tape relative to the head along the closed curve in a direction transverse to its edges until a desired turn of the tape is adjacent the head; and then reinserting the head so that the gap is brought into contact with the desired data stored on the tape.

The endless helical toroidal data storage tape described above is but one example of a novel kinematic linkage which is part of the novel drive mechanism of my recorder. The linkage in the present invention is an endless helical curve wound about a closed curve. Applying a force component tangential to the helical curve causes the linkage to rotate about the closed curve, as well as translate along it. The tangential force component may be applied, for example, by a spiral gear coupled to teeth formed in the edge of the linkage. Thus, for a single rotational input, there are two rotational outputs; one, the rotation of the helical curve about the closed curve, and two, the motion of the helical curve along the closed curve. There are no known devices in the prior art capable of performing the kinematic motion of the present device by means of a single linkage.

The characteristics of the present mechanism as a motion transducer are also applicable to the mechanism as a power transmission device. By way of example, the device may be used as a turbine by applying fluid forces to the periphery of the linkage. The fluid forces are so directed that they have a component tangential to the helical curve. These forces may be transmitted to other devices by gearing, etc.

The drive mechanism may also be used as a gear reducer in that the motion of the helix along the closed curve is a function of the lead angle of the helix and an inverse function of the number of helical turns about the closed curve. Therefore for a large number of turns at a small lead angle one can obtain a large reduction between the input rotation of the driving device and the output rotation of the helix along the closed curve. Whereas normal gear reducers are generally quite complex and require a multiplicity of gears and pinions or planetary drive systems for obtaining large gear reductions, the present device utilizes a single kinematic linkage to obtain the desired results.

It is a primary object of the invention to provide a new and improved data processing system.

It is a further object of the invention to provide a new and improved magnetic recorder.

It is a further object of the invention to provide a simple, low-weight magnetic recorder or photographic roll film device which does not require a feed reel or a takeup reel.

Another object of the invention is to provide a magnetic recorder in which continuous recording is possible for very extended periods without requiring rewinding or reversal of the tape.

Yet another object of the invention is to provide a portable magnetic recorder or photographic reader or camera having a very low power drain and moving parts of low inertia.

A still further object of the invention is to provide a tape recorder having a recording medium to any part of which random access is possible.

A still further object of the invention is to provide a new and improved transmission apparatus.

It is still a further object of the invention to provide a new and improved gear reducer for providing large gear reductions while being compact in size.

It is still a further object of the invention to provide a gear reducer that is simple in construction for large gear reductions.

It is still a further object of the invention to provide a new and improved turbine.

In accordance with the present invention there is provided a case. There are also provided supporting means for translating sound to recordable signals. Means are provided, cooperating with the supporting means to store the recordable signals. The latter means includes an endless recording medium. The recording medium is self-supporting in the configuration of a toroid.

Further, in accordance with the present invention there is provided a data processing medium for use in data processing and handling apparatus. The data processing medium comprises an elongated helically wound data processing material.

Also in accordance with the present invention there is provided a tape data processing system, comprising a base. There are provided tape support means coupled to the base for supporting a data storage tape having a plurality of turns. Sensing means are provided, including a reading head, coupled to the base and adapted for disposition in data reading proximity with the data storage tape. In addition, means are provided coupled to the base and reading head for providing relative motion between the reading head and tape loops in a direction transverse to a plurality of turn edges. The means are capable of selecting a discrete turn for reading desired data stored on the turn, thereby providing random axis.

Further, in accordance with the present invention there is provided a data processing system comprising a source of data storage tape. There is provided reading means coupled to the tape for reading data stored thereon. The reading means are so disposed that the flat side of the tape in the vicinity of the point of reading defines a plane at which information is read. In addition, there is provided driving means, coupled to the data storage tape for moving the tape arcuately about an axis transverse to the reading plane, thereby providing the data processing system.

Further, in accordance with the present invention there is provided a transmission apparatus, comprising an endless linkage means. The linkage means includes a member formed substantially in the shape of an endless helical curve, and on the whole having a toroidal shape. The linkage means is so formed as to be capable of producing curvilinear motion along the helical curve in response to a force component applied to the helical member tangentially to the curve. To provide the force component, a driving means coupled to the linkage means is provided.

For a better understanding of the present invention, together with other and further objects thereof, reference is made to the following description taken in connection with accompanying drawing and its scope will be pointed out in the appended claims.

*Principles of operation*

Figures 1A, 1B, 1C:
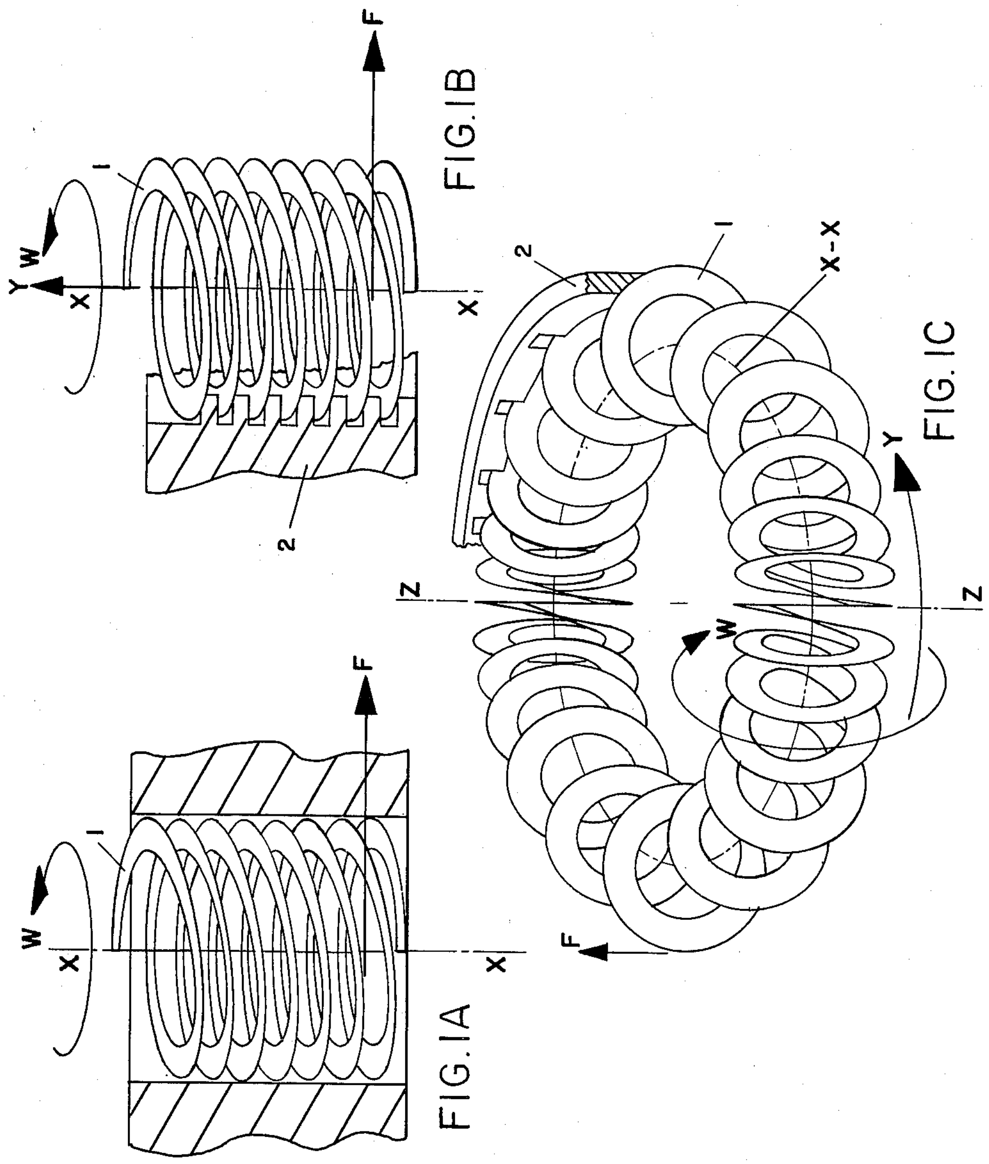
FIGS. 1A, 1B, 1C are schematic illustrations of the operation of an embodiment of the present invention.

Referring now to FIGURE 1A, 1B and 1C there is here schematically illustrated the broad operation of a novel drive mechanism embodying the present invention. Referring now more particularly to FIGURE 1A, there is here shown the operation of a typical helical drive, as is known in the art. In FIGURE 1A a circular helix 1 comprises a helical curve, wound about an axis X—X, as shown. The helix 1 is caused to rotate about the axis X—X by a force F applied tangentially to the helical curve. The application of the F causes the helix to rotate, as a body about the axis in the direction of the arrow W. If the helix is supported by a frictionless wall, the locus of each point on the helix defines a circle having a center coincidental with the axis X—X. Thus, for a single rotational input there is a single rotational output.

Referring now to FIG. 1B, the helix 1 is shown threadedly coupled to a helical stator 2, e.g.—if the helix 1 were a screw, the stator 2 would be in the form of a threaded hole. As the helix 1 is rotated about the axis X—X by a force F applied tangentially to the helical curve, the helix will rotate about the axis X—X in the direction of arrow W and translate along the axis in the direction of the arrow Y. Thus, there is here illustrated what is known as screw motion wherein a single rotational input causes a rotational and translational output.

Referring now to FIG. 1C, there is here illustrated schematically the novel drive embodying the present invention. In this configuration the helix 1 has its free ends joined to form an endless curve helically wound about a closed curve X—X. On the whole, the helix has a toroid like configuration relative to central axis Z—Z. It will be apparent to those skilled in the art that the closed curve may have any form without departing from the invention. The endless helix 1 is threadedly coupled to a stator 2, as shown. Rotation of the helix about the closed curve by a tangential force F causes the helix to translate, as a body, along the closed curve X—X. The translation along the curve defines a second rotational mode relative to the axis Z—Z. Thus, the helix exhibits two degrees of rotational output for a single degree of rotational input.

*Detailed description of magnetic tape recorder in FIGS. 2, 3, 4 and 5*

Figure 2:
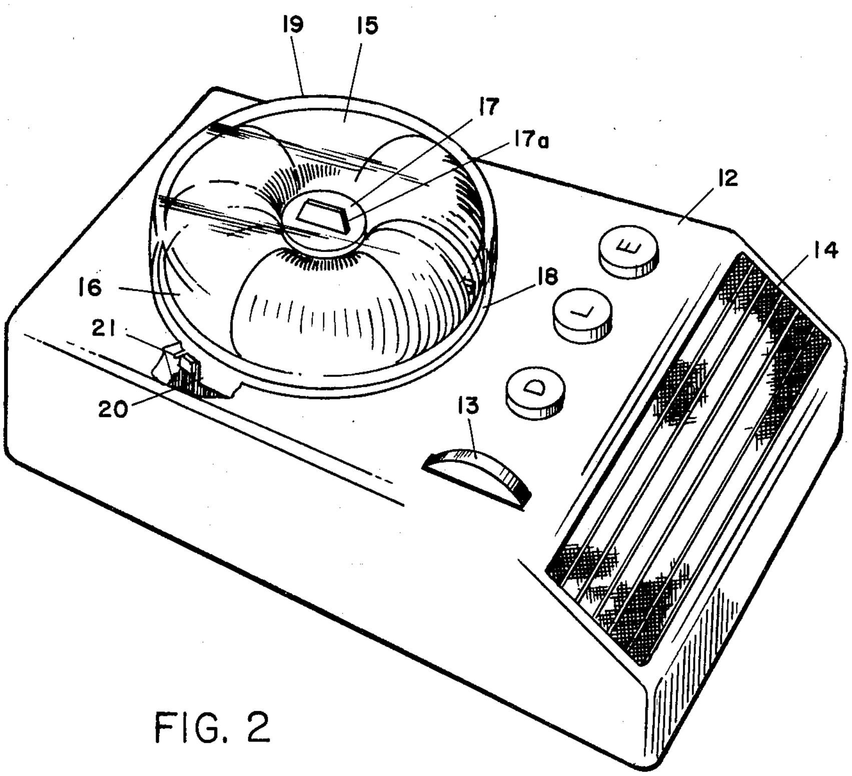
FIG. 2 is a perspective view of a magnetic tape recorder showing particularly the assembly of the new tape in operative position.

Before describing FIG. 2 which, as previously noted, is a perspective view of a magnetic tape recorder showing the novel tape in position, it should be noted that the overall size of the design illustrated is 4½" x 3½" x 1½" and its weight is approximately one pound. Referring now to FIG. 2, it may be seen that a case 12 supports all the elements of the recorder. The wheel 13 projecting from the upper surface of the case 12, as shown, is a volume control, while the buttons marked "D," "L" and "E" actuate switches (not shown) to control operation of the device for dictating, listening and erasing respectively. One end of the case 12 is formed as a microphone-speaker baffle 14. Since the foregoing listed elements may be standard in the art, no further description of them will be made. A magnetic tape 14 is disposed in a cup 16 at the left hand side of case 12 around a spindle 17. A magnetic reading head 18 is disposed so that a single turn of the tape 15 passes through the gap of the magnetic reading head 18. The term "reading" as used herein includes "recording" and "sensing" or "playback." Although head 18 may be any known magnetic reading head, it is preferred to have a split head for use with the recorder being described. This head consists of two parts, an erasing section and a reading section, as will be shown more clearly hereinafter. The free end of the spindle 17 is formed so as to provide a finger grip 17A for adjusting the position of the magnetic tape 15 with respect to the magnetic head 18 as will also be described in detail hereinafter. Covering the tape 15 so as to protect it when it is in place on the spindle 17 is a cover 19. As illustrated, cover 19 is made from a transparent material such as polyethylene but obviously it could be made from other materials just as well. Cover 19 may have several slots, one of which is shown at 20, formed about the periphery of its lower edge. Inwardly projecting pins of which one is shown at 21 attached to case 12, mates with the slots 20 so as to lock cover 19 securely in place.

Figure 3:
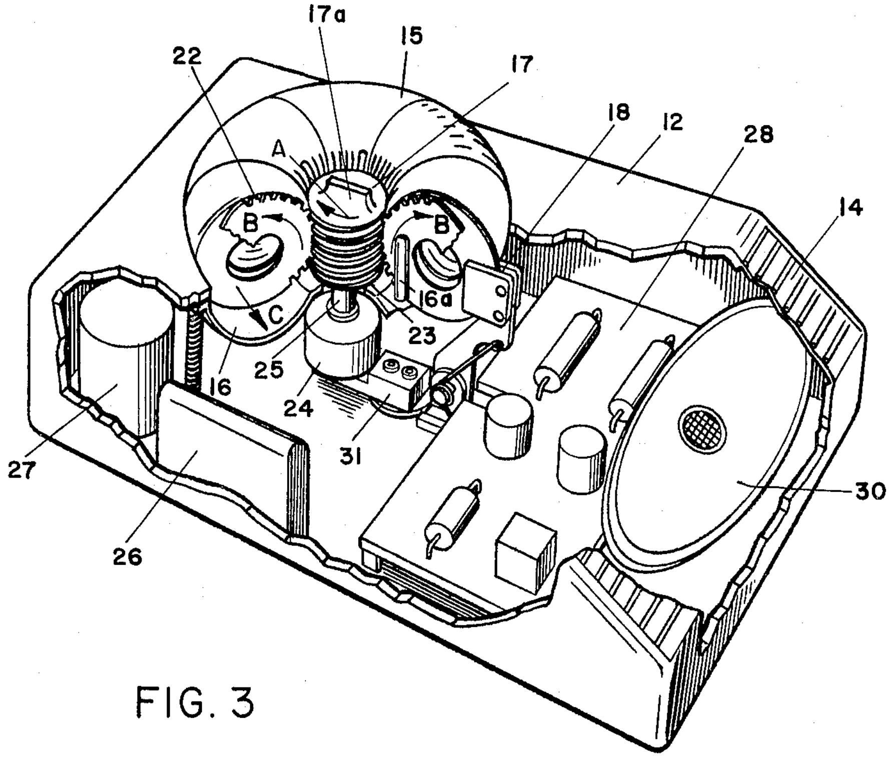
FIG. 3 is a perspective view, partially broken away, with the cover removed, showing details of the recorder illustrated in FIG. 1.

Referring now to FIG. 3, the relative positions of the components required for the working recorder may be more clearly seen. The case 12 supports all the components including the magnetic tape 15, the spindle 17, and the magnetic head 18 shown also in FIG. 2. As may more clearly be seen in FIG. 3, the outer edge of the magnetic tape 15 is serrated to form gear teeth 22 and the spindle 17 supports a helical gear 23 which latter gear mates with the teeth 22 on the tape. It should be noted, that although the helical gear 23 is shown as an intregal part of the spindle 17, there is no necessity for making the spindle 17 and spiral gear 23 from one piece. Thus, the helical gear 23 may be formed from a plastic material, as nylon, and pressed on the spindle 17.

The tape is supported in the cup 16 as shown. A plurality of fingers 16*a* are mounted on the cup extending upwardly therefrom. The fingers divide the tape into sectors thereby substantially preventing uneven spacing or "bunching" of the tape turns at any particular portion of the toroid due to the weight of the tape when the recorder is held in any position other than horizontal. This condition will also tend to exist due to unsymmetrical forces being applied to the tape. The fingers 16*a*, preferably at least four in number equally spaced about the toroid, will minimize this effect by limiting the amount the tape can travel along the cup 16 due to extraneous forces.

Other methods of driving the tape may be used. For example if the tape is made of a non-rigid (i.e.—deformable) material, a spindle having very fine helical grooves on its surface may be coupled to the edge of the tape in a manner similar to the gear 23. However, in this embodiment the edge of the tape 15 would be so disposed that the edge of the tape would be deformed by the helical teeth in the spindle thus causing the tape to be driven. It is preferable, though not essential, that the deformation of the tape edge be non-permanent. In one alternative, the tape may be frictionally driven at its periphery by selecting a suitable co-efficient of friction for the tape material.

Referring once again to FIG. 3, the spindle 17 is driven by a motor 24 through a shaft 25. The motor 24 may be energized by a battery 26 preferably of the rechargeable type, as a nickel cadmium cell, so that it may be recharged through a rectifier 27. Wires (not shown) connect the motor 24 and the battery 26 in circuit with switches (not shown) operated by the buttons "D," "L," or "E" shown in FIG. 2. It is obvious that the particular circuitry used will place the three switches in parallel so that dictating, listening or erasing may be carried out as described. Also mounted in the case 12, is a transistorized amplifier 28, shown schematically. Since the amplifier may be any one of many known amplifiers, and does not per se constitute a part of the invention, it is shown only in outline. The major requirement of the amplifier 28 is that its input and output impedance be substantially the same to allow either recording or listening to be done efficiently. Amplifier 28 is also energized by battery 26 through the switches controlled by buttons "D," "L" and "E." A speaker-microphone 30 is also mounted in the case 12. Again, the interconnecting wires between the amplifier 28, the battery 26, the magnetic head 18 and the spreaker-microphone 30 have not been shown in order to simplify the drawing. Magnetic head 18 provides a reading means, and is preferably mounted on a movable base 31 so that the magnetic head 18 is caused to move inwardly in accordance with the movement of the magnetic tape 15, or the magnetic tape 15 may be rotated with respect to the magnetic head 18 to permit longer transcribing or to allow easy access to any desired point on the magnetic tape 15.

*Detailed operation*

Referring now to FIGS. 2 and 3 together, the operation of a magnetic recorder, made according to the invention, may be clearly seen. First, a magnetic tape 15 in a cover 19 may be placed over the spindle 17 with one turn of the magnetic tape 15 in the gap of the magnetic head 18. The slots 20 in the cover 19, of course, are matched with respective ones of the pins 21 and the cover 19 is then rotated to lock it in place. The device is then ready for use. When any one of the switches controlled by buttons "D," "L" or "E" is closed, power is applied to the motor 24 from the battery 26, causing shaft 25 and spindle 17 to rotate. Since the helical gear 23 on the spindle 17 engages the gear teeth 22 formed around the edge of the magnetic tape 15, each turn of the magnetic tape 15 is also caused to rotate thus providing driving means. In the case given, if it be assumed that power is applied to the motor 24 in such polarity as to cause the spindle 17 to rotate in a clock-wise direction as shown by arrow A in FIG. 3, the individual turns of the magnetic tape 17 are caused to rotate in the direction of the arrows B. At the same time, the entire magnetic tape 15 moves in the direction shown by the arrow C. That is, each point on the magnetic tape 15 translates along a closed curve with the spindle 17 as its center. This combined rotational and translational movement of the magnetic tape 15 causes each point on the magnetic tape 15 to pass successively through the gap in the magnetic head 18. The flat side of the tape 15 in the vicinity of the point of reading at the gap defines a plane at which information is read. The driving means in the form of battery 26, motor 24, shaft 25, spindle 17, gear 23 and gear teeth 22 move the tape 15 arcuately about an axis transverse to the reading plane.

If the motor 24 is energized for an extended period of time, it will be possible for any particular point on the magnetic tape 15 to pass through the gap in the magnetic head 18 more than once. For recording, the magnetic head 18 is connected to the amplifier 28 as a recording head and the speaker-microphone 30 is connected as a microphone and the motor 24 is energized for sufficient length of time to cause points on the magnetic tape 15 to pass successively through the gap in the magnetic head 18.

Figure 5:
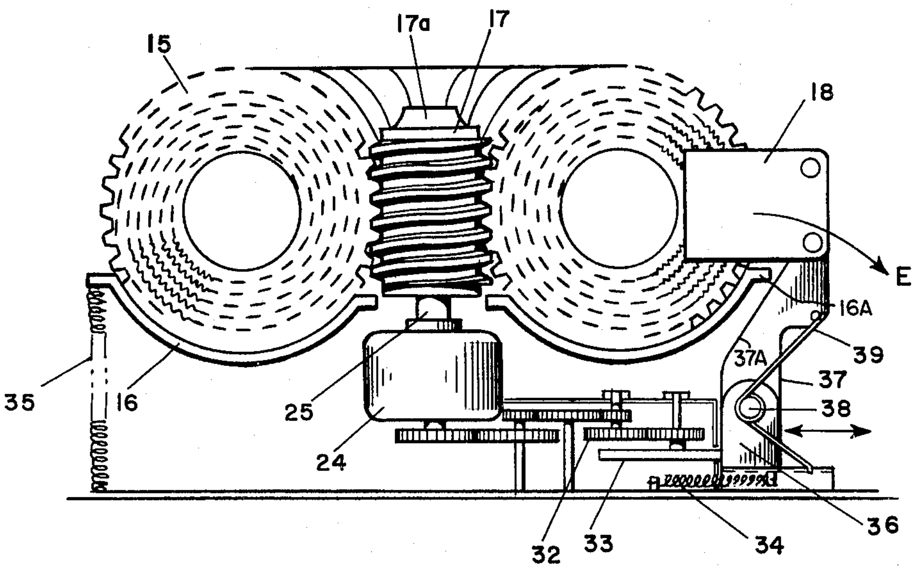
FIG. 5 is a view of the magnetic tape on a drive spindle showing particularly the way in which the tape is driven and means for recording a spiral magnetic track on such tape.

FIG. 5 is a view of the tape and driving mechanism and also shows more clearly the structure by which "multiple" track recording may be accomplished.

When the gear train (shown in more detail in connection with FIG. 5) in the movable base 31 is actuated, the magnetic head 18 is moved radially inwardly along the width of the magnetic tape 15 as the magnetic tape 15 precesses, so as to record information as is done on a phonograph record. That is, the magnetic track on the magnetic tape 15 will move spirally inwardly as shown by the dotted lines in FIG. 5 thus permitting recording of information during the period of more than one revolution of the magnetic tape 15 about the spindle 17. If, the base material of the magnetic tape has a high degree of resistance to "print through" of signals, both sides of the magnetic tape 15 are in condition for recording, after one side of the magnetic tape 15 is covered by a spiral magnetic track, the cover 19 and magnetic tape 15 may be removed, the magnetic tape 15 may be turned upside down on the spindle 17, the cover 19 replaced, the clear side of the magnetic tape 15 will then be adjacent the recording head 18 so that an equally long length of unused recording medium is available for further recording.

On the other hand, if it is desired to record continuously to save only the information recorded during the predetermined period immediately preceding the last information being recorded, there is no need for using a movable base 31 for the magnetic head 18. The movable base 31 may be deactivated, as by using a clutch assembly (not shown), or by eliminating the movable base 31 completely. Thus, the magnetic head 18 remains always at the same relative position on the wide side of the magnetic tape 15. More than one revolution of the magnetic tape 15 about the spindle 17 would ordinarily result in superposition of the magnetic tracks on the magnetic tape 15 of recordings taken at different times. However, if a known erase head is placed before the record head and interconnected therewith, a clear tape is always passed through the record head and any difficulty from this score is easily avoided.

As long as the motor 24 is energized so as to move the tape 15 in either mode just described, the amplifier is also energized by battery 26. Therefore, when recording, any sounds picked up by the speaker-microphone 30 are translated by the amplifier 28 and the magnetic head 18 to a magnetic record on the surface of the tape 15. Reproduction of such a record is simply accomplished by reversing the positions of the magnetic head 18 and the speaker-microphone 30 with respect to the amplifier 28 and energizing the motor 24 again so as to move the magnetic tape 15 past the magnetic head 18.

Figure 4:
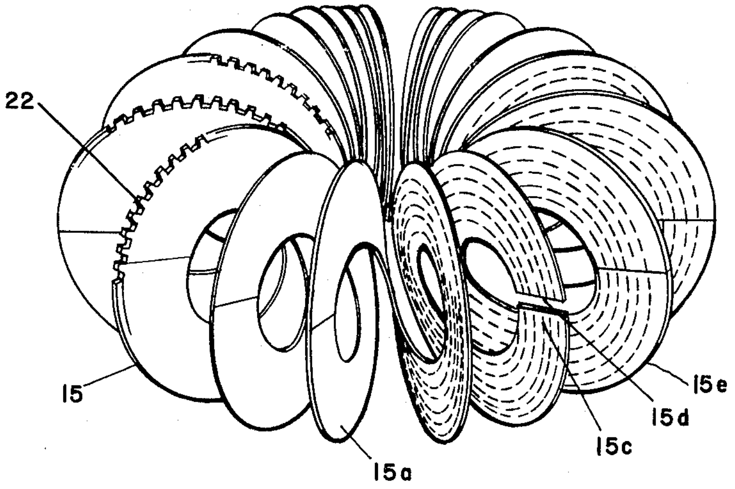
FIG. 4 is a perspective view of a helical tape about to be joined to form a toroid.

Referring now to FIG. 4, the constructional details of a magnetic tape for use according to the invention may be seen. It is noted that FIG. 4 illustrates a helically formed magnetic tape as it is finally being assembled to form a toroid. In this particular embodiment, the magnetic tape 15 consists of a number of sequentially joined ring-like sections 15A. Sections 15A are preferably formed by stamping rings of a desired size from a plastic base material, as acetate, Mylar or polyethylene to provide a carrier tape. Each ring is then cut radially to form two edges 15C, 15D. Edge 15C of one ring 15A is then butted against edge 15D of the next ring 15A and the two edges 15C, 15D are welded together. Data processing means in the form of a coating 15E of ferric oxide (or any other magnetic recording material) is applied to at least one surface of each ring 15A, as illustrated, to provide the required magnetic recording medium. Application of a coating 15E as well as formation of the gear teeth 22A obviously may be accomplished by known techniques either before or after the rings are joined.

It is self-evident that the foregoing method of construction need not necessarily be followed. As a matter of fact, the base need not consist of ring-like sections 15A supporting a magnetizable coating 15E but may be a helical coil having only one joint formed from standard flat magnetic tape. Since the tape is essentially a magnetizable coating on or a magnetizable impregnation of, a base of plastic material, any known method of joining the ends of such material may be used. For example, the tape may be placed in a fixture in which heat and pressure may be simultaneously applied so as to run the materials at the two ends together. In connection with this operation, it is highly desirable, of course, that care be taken to join the ends so that no discontinuity in the gear teeth results. Other methods of forming the tape such as, extruding, roll forming, turning, etc., may be used.

FIG. 5 is an isolated view of the tape and driving mechanism and also shows more clearly structure by which "multiple" track recording may be accomplished. In FIG. 5, the magnetic tape 15 is shown being driven by spindle 17 through shaft 25 which is attached in turn to the rotor of motor 24. The rotor shaft of motor 24 also is extended in a direction opposite to the shaft 25 so as to drive a gear train 32 to rotate a cam 33. A spring 34 holds the base of the magnetic head 18 against the cam 33 as shown. If the gear ratio of the gear train 32 is properly selected, the magnetic head 18 will move inwardly the distance of one magnetic track during the period of one revolution of the magnetic tape 15 around the spindle 17. The resultant of the motion of the magnetic tape 15 and the magnetic head 18 is the spiral path illustrated in FIG. 5 by the dotted lines on the magnetic tape 15. By making the cam surface stepped, with intermittent dwell surfaces, the device may be used for multiple track recording, wherein the head 18 remains stationary during one revolution of the magnetic tape 15 around the spindle 17. At the completion of one revolution the cam causes the head to move radially inward the distance of at least one magnetic track width. The head again remains stationary during the next revolution of the tape 15. At the end of the second revolution, the head 18 moves radially inward another track width, and remains stationary during the next revolution of the tape 15 around the spindle 17. The process may be repeated, depending on the width of tape, track width, and number of tracks desired. In this embodiment, the magnetic tracks will each be of constant radius concentric with the helical turns.

A way in which any portion of the tape may be brought quickly and easily into position with respect to the magnetic head 18 is also shown in FIG. 5. As will become clear, motor 24 is de-energized during tape positioning. Cup 16, which contributes to the support of the magnetic tape 15 in operative position with respect to spindle 17 and magnetic head 18, is in turn held in position by three equally spaced compression springs 35 (only one of these springs shown). The magnetic head 18 consists of a base 36 and an arm 37 pivoted on the base 36 by a pin 38 and urged into the position illustrated by a spring 39.

When spindle 17 is pressed downwardly, as by pushing on finger grip 17A, this motion is transmitted through the magnetic tape 15 to the cup 16. Cup 16 then moves downwardly against compression springs 35. At the same time motor 24 is moved downwardly to disengage the pinion gear on the rotor shaft thereof from the other gears in gear train 32.

The downward movement of cup 16 brings its flange 16A into contact with the inclined plane 37A on arm 37 and forces arm 37 to pivot in the direction shown by arrow E until all parts of magnetic head 18 are clear of the magnetic tape 15. Once the foregoing motions have occurred, the magnetic tape 15 may be moved as desired simply by twisting finger grip 17A until the desired portion of the tape is adjacent the magnetic head 18. Since only the magnetic tape 15, the spindle 17 and the rotor of motor 24 need be turned, very little force is required. It will also be appreciated that positioning may be facilitated by applying fiduciary marks on, or adjacent, the periphery of the magnetic tape 15 to permit visual observation of tape position.

Figure 6:
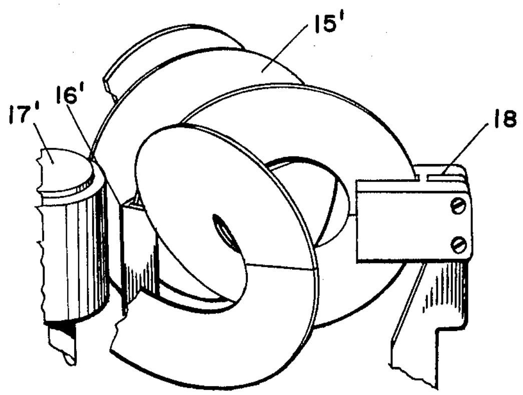
FIG. 6 is a view of portion of an alternative form of tape showing a magnetic recording or reading head.

Referring now to FIG. 6, it may be seen that it is not necessary for each turn of magnetic tape 15′ to bear against the spindle 17′ in order that the tape be caused to precess around the spindle. It may also be seen that it is also not necessary that there be gear teeth formed in the periphery of the tape in order to attain the advantage of this invention. In FIG. 6, one turn of the magnetic tape 15′ is brought around V-slot 16′ as illustrated, so that the turn bearing against the slot is displaced outwardly from the remaining turns in the toroid. V-slot 16′ is preferably attached at its lower end (not shown) to cup 16, although such attachment is not necessary because, obviously, V-slot 16′ need only be fixed in relation to the spindle 17′ and magnetic head 18 in order to accomplish its desired purpose.

The drive for magnetic tape 15′ is the same in principle to the drive heretofore discussed in connection with FIGS. 3 and 5. However, it has been found possible to eliminate, for certain application, a geared drive between the spindle 17′ and the magnetic tape 15′ and to replace such a drive with a frictional drive as shown. However, it will be appreciated that a V-slot may be used even with the geared drive of the previous figures. As a matter of fact, it has been found possible to drive the magnetic tape even when more than one turn is not in contact with the spindle.

A modification of the invention will become evident to those having skill in the art upon inspection of FIG. 6. That is, roll photographic film with either frames or strip recording thereon may be substituted for the magnetic tape 15, 15′ and optical viewing means substituted for the magnetic head 18. Since there is an unobstructed line-of-sight through the film at the position it occupies when it precesses past the place where the magnetic head is located, it is evident that optical viewing means, as a projection light and a lens system, may be disposed so that the images on the film may be observed.

Figures 7, 8:
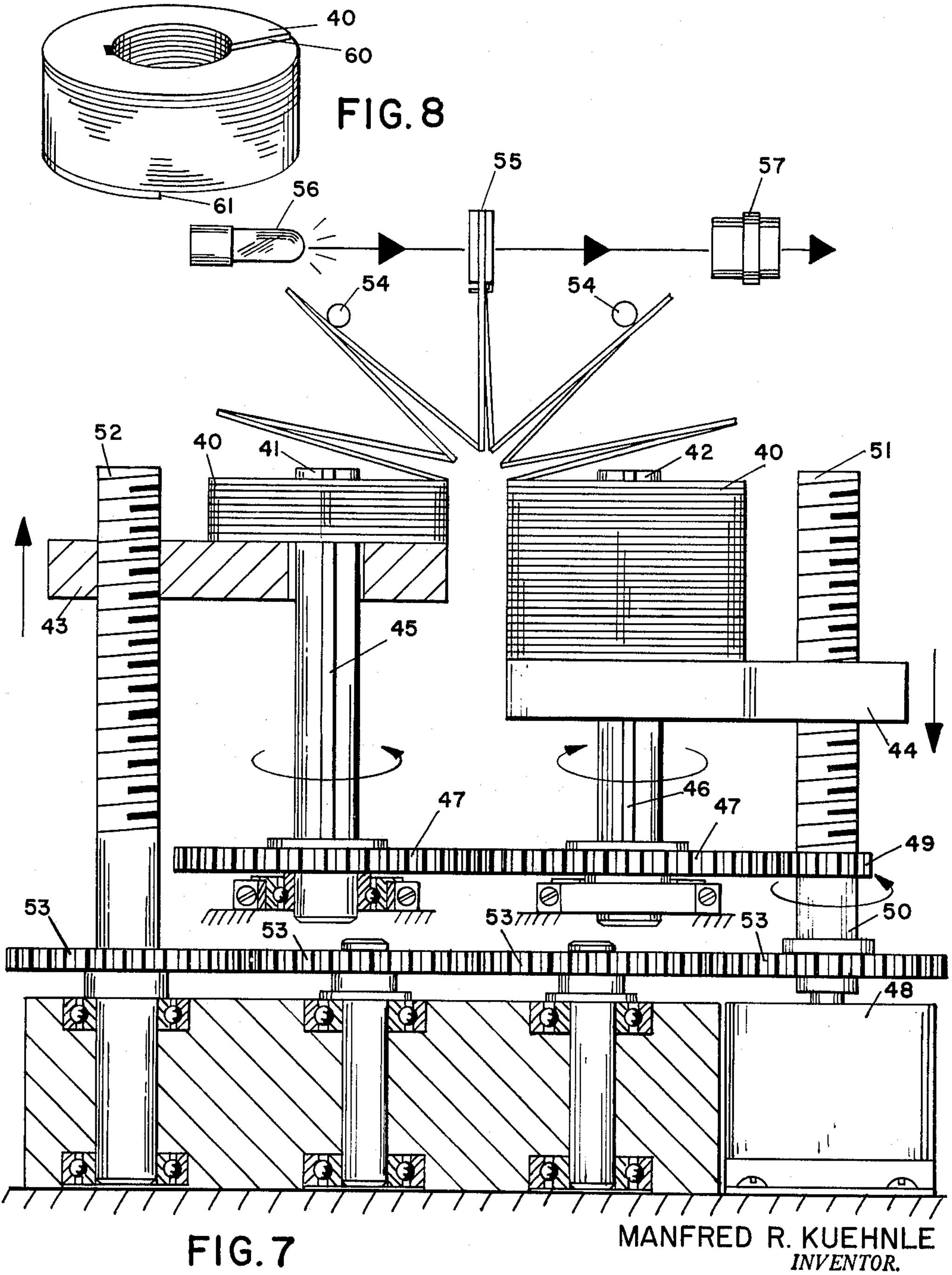
FIG. 7 is a partially schematic and simplified view of an alternative embodiment of the invention in which photographic film is used instead of magnetic tape.
FIG. 8 is a view showing the form of film particularly useful in the embodiment of the invention shown in FIG. 7.

*Description and operation of the reader in FIG. 7*

Referring now to FIG. 7, another embodiment of the inventions particularly useful with photographich film is shown. In this embodiment, the photographic film 40 is helically wound about a pair of parallel spindles 41 and 42. The ends of the film are supported on movable platens 43 and 44, as illustrated. In this embodiment, the spindles 41 and 42 rotate in opposite directions causing the film to be unwound from one spindle and wound on to the other spindle. The film travelling from one spindle to the other moves in a helical path between the two spindles. The spindles 41 and 42 have keys and 45 and 46 coupled thereto, for engagement with a keyway of like shape on the inner periphery of the film. The keys 45 and 46 cooperate with the keyways in the film to provide positive drive for the film at its inner periphery. In the alternative the spindles 41 and 42 may be tapered to drive the tape by frictional engagement. As shown, spindles 45 and 46 are rotated through a pair of spur gears 47, coupled to the spindles as shown. The gears 47 are coupled to a driving motor 48 through a pinion 49 and motor shaft 50. Rotation of the motor shaft 50 in the direction shown causes the spindles 45 and 46 to rotate in the direction of the arrows. The movable platen 44 is driven by a screw 51 that is coupled directly to the motor 48, through the motor shaft 50.

The movable platen 43 is driven by spur gears 53 which are coupled to the motor 48. The gear train is so chosen that the screws 51 and 52 rotate at an equal speed in opposite directions. As indicated by the arrows in the drawing, the platen 43 moves vertically upward and platen 44 moves vertically downward when the motor shaft rotates counter-clockwise. Two guide members 54 may be placed between the two spindles as indicated generally in the figure. The guides prevent any more than one turn of the helically coiled film from appearing in a line of sight with a film gate 55 at any one time. The film gate 55 preferably is located substantially between the two.

The combined rotational and translational motion of the 40 causes the film 40 to pass successively through the film gate 55. The film gate 55 in cooperation with the film 40 therein, defines a point of reading. The flat side of the film 40 in the vicinity of the film gate 55 defines a plane at which information is read. The driving means causes the film 40 to move arcuately about an axis transverse to the reading plane.

It should also be noted in connection with all the embodiments of the invention described hereinbefore that since movement of the recording medium is accomplished by having driving means cooperating with each one, or almost each one, of the turns of the helix, slippage between the driving means and a few of the turns is not critical. The natural resiliency of the tape or film also serves to dampen out any effect of slippage.

FIG. 8 shows the manner in which the photographic film 40 may be coiled for storage before installation in the reader shown in FIG. 6. The photograph film 40 is simply formed into a closely-packed edge-wound helix having two free ends 60, 61. When it is desired to view the images on the coil, one simply inserts the coil over the spindle 40, so that free end 61 is on the platen 43, then, the free end 62 is pulled over and inserted on to the spindle 42 with care being taken to allow one turn only to lie between guide members 54 as shown in FIG. 7 may also be used for storing magnetic (or photographich film) which is to be used in an endless toroidal coil shape. In the event tape or film is stored in its helical coil form in order to save space, it is a simple matter to weld or otherwise attach the free ends 60, 61 together to form a toroid.

The specific examples of different magnetic and photographic devices described hereinbefore all use a novel method equally well adapted to processing (meaning recording and/or playing back) magnetic tape, for a photographic roll film, punches tape, etc.

The method contemplated by the invention involves strengthening the heretofore considered weak tape or film to such an extent that feed reels and takeup reels are either not necessary or are very much simplified over the prior art.

Whatever kind of information bearing medium is to be operated on, the basic method therefore is the same. First, the medium is formed into a helix, then the helix is rotated by applying driving means at many points along the helix preferably at substantially equally spaced points along the periphery thereof, so as to cause the turns of the helix to rotate simultaneously in such a manner that individual points thereon move past the driving means. If it is desired that an endless recording medium be provided, then the free ends of the helix may be joined together so as to form a toroid from the helix.

The concept of applying rotational forces simultaneously at many points along the helix is, along with the concept of shaping the information bearing medium in the form of a helix or toroidal helix, thought to provide to a large extent the advantages deriving from the method of the invention. In brief, the contemplated method involves moving substantially the entire length of an elongated information bearing medium in substantially the same way, i.e., along a helical path, in contrast with known methods of handling corresponding media. In known methods of handling elongated information bearing media, the particular medium being processed or used is moved in different ways during processing or use. That is, when the medium is not being used or processed, it is being wound onto or unwound from a spool or reel, and when the medium is being used or processed, it is moved by simple translatory motion past a station in which the particular operation desired is performed.

Although discussion has been limited to application of the invention to magnetic recorders using plastic-base tapes and readers using photographic film, neither the method nor the apparatus contemplated by the inventions should be so restricted. It is clear that other types of information bearing, or recording media, may be used in place of plastic tapes or films. For example, if it be desired to provide a magnetic recording medium for use under high shock or temperature conditions, a metallic ribbon or wire would serve as the base for a magnetizable material. Using a metallic ribbon or wire provides greater strength and resistance to high temperature operation without detracting from the advantages gained by the invention. Since a wire may be used according to the invention, it follows then that the cross-sectional shape of the information bearing or recording medium is not critical. It is also contemplated that invention may be used in punched tape data handling systems with slight modification. One such modification being the use of brushes and suitable contact members for the data transducer. It is necessary only that the material used and the cross-section shape of the helix be such that there is enough resiliency to permit bending of the helix as desired.

A review of the figures of the drawing shows that the contemplated recording medium need not necessarily be in the form of a toroid having circular symmetry about an axis. In addition to the shapes illustrated and described, other configurations are possible without departing from the invention. For example, an endless recording medium may have a generally rectangular outline when viewed from above at approximately a right angle to the axis of the helix.

Even the particular driving means which have been illustrated may be modified. Thus, if it is desired that linear velocity of the information bearing medium past the recording head or viewing station be maintained within close tolerances, auxiliary driving means could easily be provided. Such auxiliary driving means could take the form of two pairs of rollers, one pair on either side of the recording station or viewing station and driven in such a manner that the linear velocity of the recording medium there between is constant, regardless of any momentary changes in velocity of the main body of the recording medium.

Another equally obvious modification to the invention relates to the particular recording head and recording medium used for recording sound. If instead of recording magnetically it is desired to record sounds with a stylus operative on a wax-like medium, only mechanical changes are necessary. That is, the magnetic head may be replaced by a stylus and the magnetizable tape or recording medium may be replaced by any known wax-like recording material on a ribbon base. Such a recording medium would be particularly useful in stereophonic sound applications, it being evident that recording of two different signals simultaneously on opposite sides of the recording medium could easily be accomplished.

Figure 9:
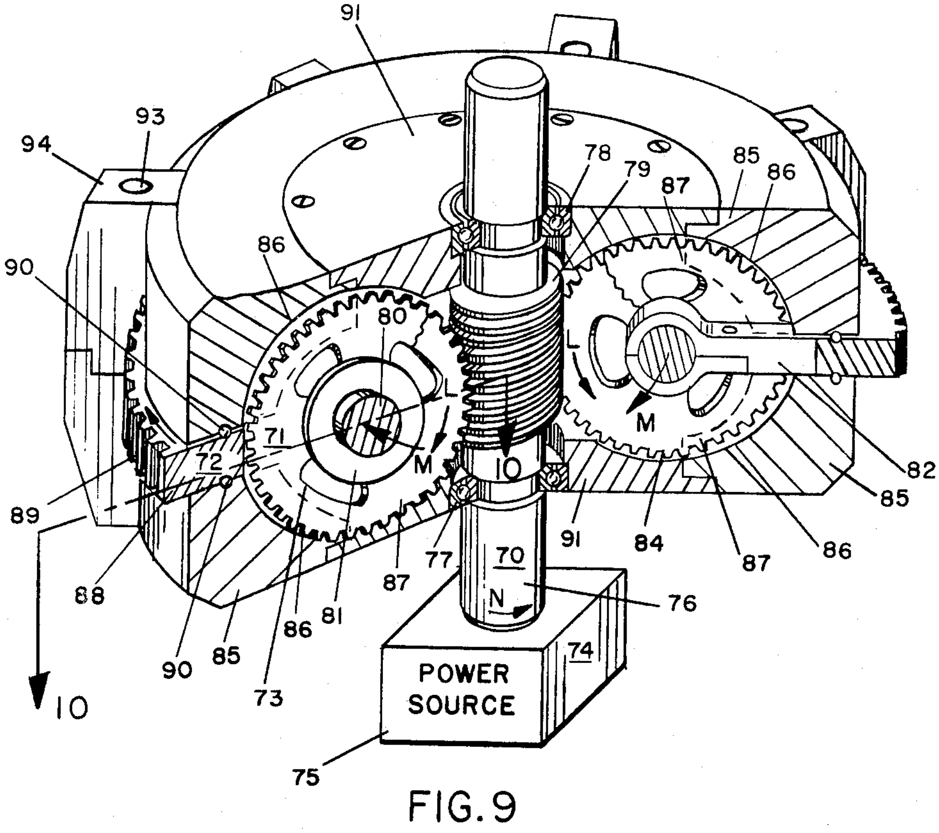
FIG. 9 is a perspective view, partially broken away, of a transmission apparatus embodying the present invention.
Figure 10:
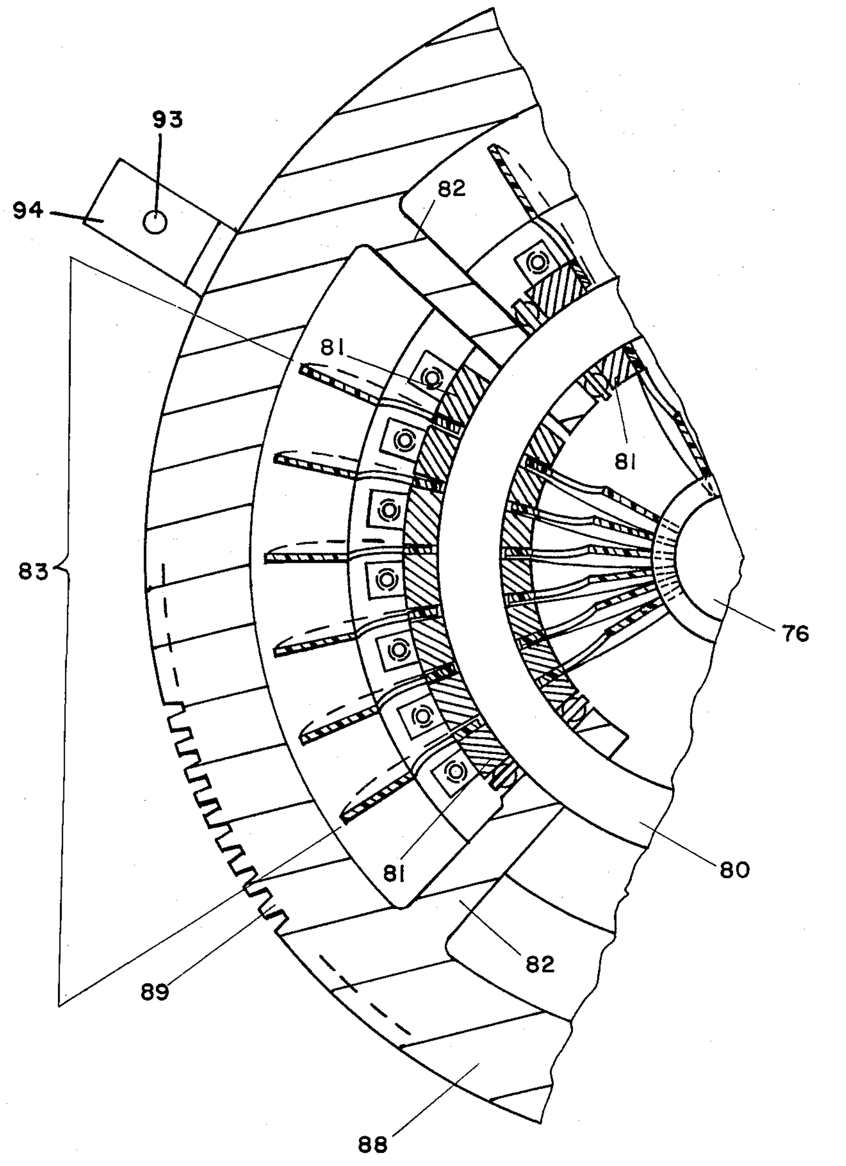
FIG. 10 is a sectional view taken along line 10—10 in FIG. 9.

*Description and operation of the transmission apparatus in FIGS. 9 and 10*

Referring now to FIGS. 9 and 10, together, there is here illustrated a transmission apparatus in the form of a gear reducer embodying the present invention. The illustrated apparatus consists of three main sub-assemblies; an input section 70 to connect the apparatus with a driving means; a transmission section 71; and an output section 72 coupled to the transmission section.

The transmission section includes a linkage means in the form of an endless gear 73. The endless gear 73 is formed as an endless helical curve and on the whole has a toroidal shape. The gear is, therefore, helically wound about a closed curve. The input section 70 in cooperation with the driving means 74 applies a force component to gear 73, tangentially to the helical curve whereby the gear moves in a curvilinear path along the helical curve. The helical gear, therefore, rotates about the closed curve as well as along the curve. The motion along the curve is transmitted to the output section 72 which is rotated in accordance with the motion of the helical gear 73 along the closed curve. In this manner the device may transmit motion or force from the driving means.

The power input section 70 includes a power source 75, shown schematically in FIG. 9. Any known source of power having a rotary output may be used. Connected to the power source 75 is a shaft 76, shown in FIG. 9 as extending upwardly through the center of the transmission device and being supported by a pair of ball bearings 77 and 78. A helical gear 79 is formed on the shaft 76 or attached thereto in any convenient known manner, so that the gear 79 rotates with shaft 76.

The power transmission or speed reduction section 71 includes a ring 80 having a number of shoulders 81 formed thereon or attached thereto again in any known manner. Intermediate between certain of the shoulders 71, a number of connecting arms 82 are attached to the ring 80 projecting outwardly therefrom as shown on the right in FIG. 9 and in more detail in FIG. 10. In passing, it should be understood that the number of shoulders 81 and the number of connecting arms 82 may be varied within wide limits without departing from the invention. Where spokes are used to couple the endless gear 73 to the ring 80, it may be desirable in high load environments, to have a separate shoulder for each spoke. This type of configuration will insure in-plane radial rigidity and minimize the need for out-of-plane flexibility of the spokes as they rotate about the ring 80.

In FIGS. 9 and 10, the number of helical turns 83 of the endless gear corresponds to the number of shoulders disposed around the ring 80. It should be noted with respect to FIG. 9, that gear teeth 84 are formed around the periphery of the helical turns 83 so that each of the elements may mesh with the helical gear 79. A stator 85 is passed over a sector of the helical elements 83 outwardly of the ring 80 as illustrated in FIG. 9. The stator has helical grooves 86 formed therein, the number of grooves corresponding to the number of helical turns 83 of the endless gear 73. One side wall 87 of the groove 86 is shown in phantom in FIG. 10. As shown, in FIG. 9, the grooves overlap the helical turns 83. The stator halves are held together by pins 93 in ribs 94. The stator thereby guides the endless gear for rotation along the ring 80 as it is rotated about the ring.

The power output section 72 basically consists in the contemplated embodiment of the invention simply as a ring gear 88 having outside gear teeth 89 formed thereon. The outwardly projecting sections of connecting arms 82 are joined to the ring gear as by welding to the ring gear 88 so that ring 80 and ring gear 88 form a unitary structure. In the preferred embodiment additional support for ring gear 88 is provided through a ball bearing assembly 90 by means of which stator 85 cooperates with the ring gear 88 as illustrated. In addition, it should be noted that plates 91 may be attached to stator 85 so that stator 85 may cooperate with the outer race of the ball bearing assemblies 77 and 78 to insure alignment. The gear teeth 89 may cooperate with any appropriately spaced gear teeth (not shown) in order to transmit the motion of ring gear 88 to any end device. Since such operation of an end device does not constitute a part of the invention, no illustration thereof has been made.

In another modification, the endless helical gear 73 may be cut into sectors, each sector to be placed between two connecting arms 82. This type of construction eliminates the necessity of threading the gear 73 over the connecting arms, which may be, relatively thick in comparison to the thickness of the endless gear 73. This construction, however, does not change the mode of operation of the device, in combination all of the sectors operate as if the gear 73 was endless.

In operation, the power source 75 is energized so as to drive the shaft 76 and the helical gear 79. The direction of rotation, for example, may be as indicated by the arrow above shaft 25. Since the helical gear 31 is attached to shaft 25, it also rotates in the same direction. The helical turns 83 rotate in the direction of the arrows L causing the ring 80 and gear 88 to rotate in the direction of arrows M as illustrated.

Referring now in more detail to FIGS. 9 and 10, the power source 75 is energized causing the shaft 76 and helical gear 79 to rotate in the direction of the arrow N. The helical gear 79 applies a force component tangentially to the endless helical curve of the endless gear 73 by meshing with the teeth 76 formed on the edge of the gear 73. The gears 73 and 79 are so disposed in the preferred embodiment, that each helical turn 83 is in meshing driven relationship with the gear 79. It will be apparent that other means of applying the tangential force component, may be used where desired, i.e.—friction drive, fluid drive, electrical or electromagnetic drive, etc. In addition, if desired all the helical turns need not be driven simultaneously by the driving means. In the preferred embodiment, however, all the helical turns are driven simultaneously so that the input load from the driving means is equally distributed amongst the helical turns 83. As the gear 73 rotates it is guided through the helical grooves 86 in the stator 85. As the gear 73 is guided through the grooves 86 it bears on the forwardmost (relative to its direction of travel) walls 87 of the grooves 86 which act as a wedge in applying a reaction force to the flat surface of the gear. This force is transmitted to the radially disposed shoulders 81 on the ring 80. The additive force distribution transmitted through the gear 73 causes the ring 80 to rotate in the direction of the arrow M. The ring gear 88 is rigidly connected to the ring 80 through the connecting arms 82 and rotates with ring 80, thereby providing the transmission apparatus.

The speed at which the ring gear 88 moves may be easily calculated if certain parameters are known. The parameters are the speed of rotation of the shaft 76, the number of teeth in the helical gear 79, the number of teeth 84 in each turn 83 of the endless gear 73 and the number of helical grooves 86 in the stator 85. For each turn of the shaft 76, each helical turn 83 is rotated the distance of one tooth pitch. In other words, the gear ratio between the helical gear 79 and the helical element 73 is proportional to the number of threads on the helical gear 79, divided by the number of teeth 86 on one turn of the helical element 73. The translational movement of the helical element 73 along the closed curve is best described with relation to the helical groove 86. That is, for each single rotation of a turn of the helical element 73, the endless gear translates (or rotates relative to the center of shaft 76) a distance equal to the pitch of the helical grooves. The rotational speed of the helix about the shaft 76 then is proportional to the rotational speed of the helix about the ring 80 divided by the number of helical grooves (which is equal to the number of helical turns in the helical element 73). Putting the foregoing together, the overall gear ratio of the device is proportional to the number of teeth in the helical gear 79, divided by the product of the number of teeth in each helical turn 83 and the number of helical grooves 86 or number of turns 83. Therefore, high gear reductions may be obtained in a small space by having a large number of turns.

Another advantage derived from the invention is that loading of the various moving elements is done much more efficiently than in conventional transmissions. Since at least one tooth on each turn of the helical element 73 bears against the helical gear 79, it is evident that a loading on the teeth is distributed far more evenly than in conventional gearing. If for example, there are one hundred turns in the helical element 73, it is evident that each tooth in engagement with the helical element 79 theoretically carries 1/100th of the load carried by a corresponding spur gear such as used in conventional transmissions.

Since each turn of the helical elements 83 is required to carry only a portion of the load to be transmitted, each such turn may be fabricated from relatively thin or flexible material. Consequently, a transmission which is subjected to shock, vibration or sudden loading may be easily made.

If one desires that the direction of rotation of the output or ring gear 88 be in the same direction of rotation of shaft 76, several ways are open in which to accomplish this. By way of example, a left hand helical gear may be inserted in place of the right hand helical gear 79 illustrated, then the helical turns 83 will rotate and translate in the opposite direction to that illustrated.

The present invention is not limited to circular devices as illustrated, but is broadly applicable to closed curves other than circles. In order to adapt this device for other curves it may be desirable, for example, to make the ring 80 and the pick-off device 88 non-rigid, thereby to allow motion along any desired shape of closed curve.

Figure 11:
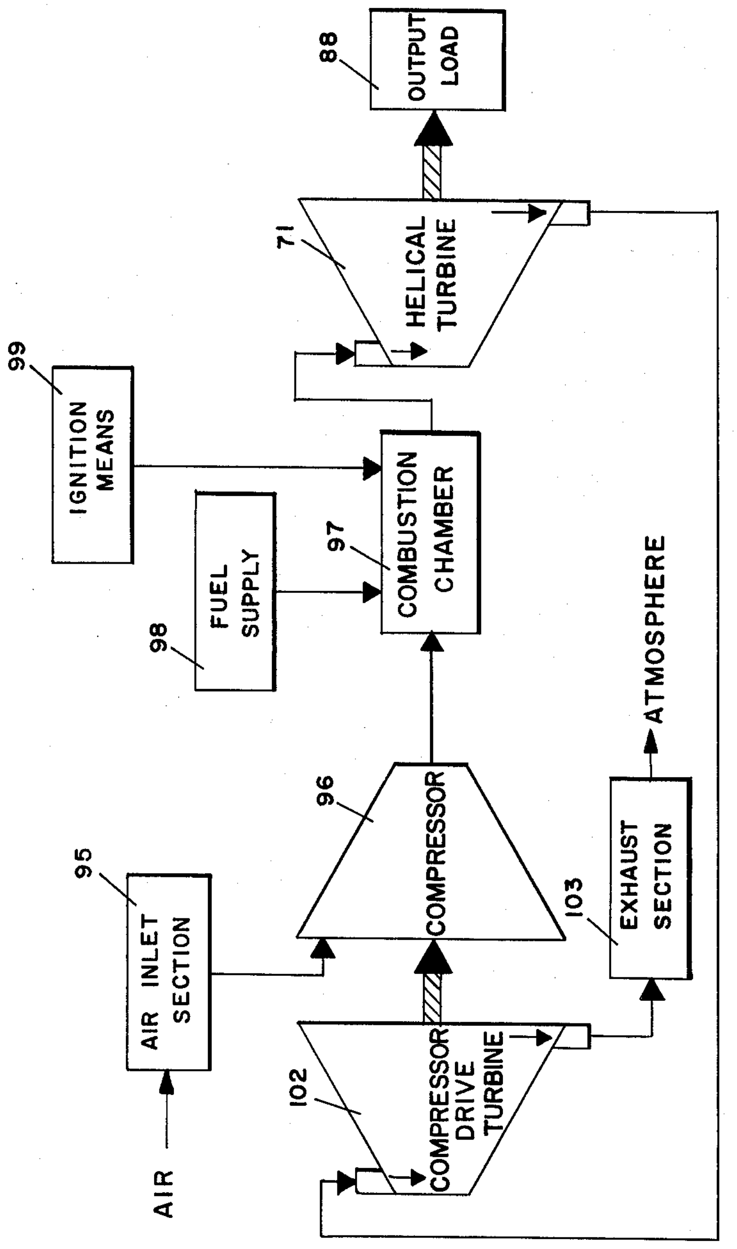
FIG. 11 is a block diagram schematically illustrating the operation of another transmission apparatus embodying the invention.
Figure 12:
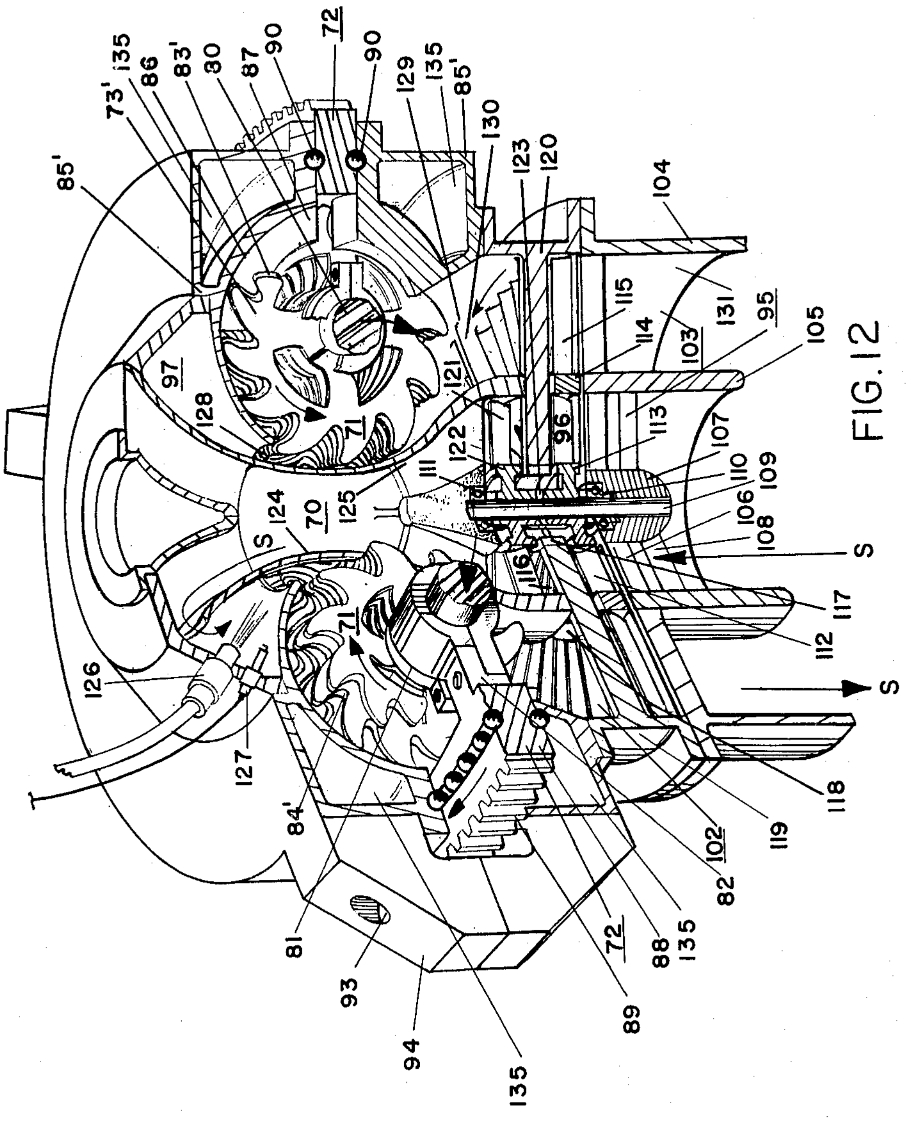
FIG. 12 is a perspective view, partially broken away, of the transmission apparatus shown schematically in FIG. 11.

*Description and operation of the turbine illustrated in FIG. 11 and FIG. 12*

Referring now to FIGS. 11 and 12 there is here illustrated a transmission apparatus embodying the present invention in the form of a gas turbine. This embodiment of the invention is generally similar to the corresponding embodiment shown in FIGS. 9 and 10. Accordingly, corresponding units or elements are indicated by identical reference numerals, while similar units or elements are indicated in FIGS. 11 and 12 by the same reference numerals as units or elements in FIGS. 9 and 10, but with a prime prefix. The principal distinction between this embodiment and the gear reducer shown in FIGS. 9 and 10 is in the manner of applying the tangential force to the endless helical element. In the gear reducer embodiment, the endless helical element 73 shown in FIG. 9 has gear teeth 84 disposed about its periphery. The tangential force is applied through a helical gear 79 which meshes with the gear teeth 84. In this embodiment, the endless helical element has impeller blades disposed about its periphery. The tangential forces are applied by high velocity gasses impinging on the impeller blades. Application of the tangential force to the endless helical element causes the element to rotate about the closed curve and translate along it in the manner heretofore described with reference to the gear reducer and to FIGS. 1A, 1B and 1C.

Referring in detail to FIG. 11 there is here schematically illustrated in block diagram form, the major components of the gas turbine and their functional interrelation. As shown, air enters the turbine through an air inlet section 95 and flows to a compressor 96 where it is compressed. The compressed air flows to a combustion chamber 97 where it is mixed with fuel entering the combustion chamber from a fuel supply 98. The fuel-air mixture is ignited by an igniter 99 coupled to the combustion chamber. The heated gas flows to a helical turbine 71 whose operation will be described in detail hereinafter. The helical turbine is mechanically coupled to a load 88 whose form is dependent on the desired end use of the apparatus. Gas leaving the helical turbine 71 flows to a compressor drive turbine 102 which is mechanically coupled to the compressor 96 for driving it. Exhaust gas leaving the compressor drive turbine 102 flows to an exhaust section 103 where it is discharged to the atmosphere.

Referring now to FIG. 12, there is here shown a perspective view, partially broken away, of the gas turbine. In this drawing the direction of air and gas flow is indicated by the arrows S. For convenience of explanation the terms "downstream" and "upstream" as used hereinafter will refer to the direction of gas or air flow through the component being described.

The illustrated apparatus consists of three main subassemblies; and input section 70 to provide a driving means for the transmission; a transmission section 71; and an output section 72 coupled to the transmission section.

The transmission section 71 includes linkage means in the form of an endless helical turbine 73'. The endless turbine 73' is formed as an endless helical curve and on the whole has a toroidal shape. The turbine is, therefore, helically wound about a closed curve. Applying a force component tangentially to the helical curve causes the turbine to move in a curvilinear path along the helical curve, whereby the turbine 73' rotates about the closed curve while simultaneously translating along it. The latter motion is transmitted to the output section 72 which is rotated in accordance with the motion of the turbine along the closed curve.

The turbine includes an entrance housing 104 having two concentric air passages therein including the air inlet section 95. The inlet section 95 includes a cylindrical duct 105, having a plurality of radial inlet guide vanes 106 circumferentially disposed at the downstream end of the duct. The inlet guide vanes are supported between the inner walls of the duct 105 and a central hub 107. The hub 107 is so shaped as to direct the air flow from the center of the duct, radially outward to the compressor rotor blading. The hub 107 is supported by a plurality of radial spokes 108 coupled to the hub 107 and the inner wall of the duct 105. A shaft 109 is supported on one of its ends by a bearing 110 supported in the hub 107. The opposite end of the shaft is mounted in a bearing 111.

The compressor 96 in the preferred embodiment, is an axial flow compressor, and is shown in FIG. 12 as having two stages. The first stage of the compressor includes circumferentially disposed rotor blades 112 mounted at their bases to a first stage rotor disk 113. The rotor disk 113 is mounted on the shaft 109 for rotation therewith. A ring 114 is affixed to the blade tips to prevent radial flow of the air to the turbine rotor blades 115 mounted in the ring. The turbine rotor blades 115 drive the compressor through the ring 114, first stage rotor blades 112, first stage disk 113 and shaft 109. Circumferentially disposed, radial, compressor stator blades 116 are mounted between a pair of concentric rings 117 and 118. The rings are supported in a housing 119 through radial spokes 120. The second stage of the compressor rotor includes circumferentially disposed compressor rotor blades 121 mounted in a second stage rotor disk 122. The disk 122 is mounted on the shaft 109 and is coupled to the first stage disk by face splines 123.

A central duct 124 guides the air from the compressor to the combustion chamber 97. Supported in the duct downstream of the compressor second stage is a hub 116 for supporting the downstream end of the compressor shaft 109 in a bearing 111. The hub 116 is supported by the wall of the duct 124 through a plurality of radial spokes 125. Located at the downstream end of the duct 124 there are a plurality of circumferential openings coupling the duct to an annular combustion chamber 97. Circumferentially disposed in the wall of the combustion chamber are a plurality of fuel nozzles 126 coupled to a fuel supply, not shown, and a plurality of igniters 127. The fuel nozzles and igniters may be any one of the types well known in the art suitable for this purpose. For the sake of clarity only a single igniter and fuel nozzle have been shown, it being understood that the number and actual disposition of the elements would be dependent upon the turbine performance characteristics. At the downstream end of the combustion chamber 97 there are a plurality of orifices 128 coupling the combustion chamber to the transmission section.

The transmission section includes a linkage means in the form of an endless helical turbine 73. The transmission section 71 includes a ring 80, having a number of shoulders 81 formed thereon, or attached thereto, again in any known manner. Intermediate between certain of the shoulders 81 a number of connecting arms 82 are attached to the ring 80 projecting outwardly therefrom, as shown. In passing, it should be understood that the number of shoulders 81 and the number of connecting arms 82 may be varied within wide limits without departing from the invention. Where spokes are used to couple the endless turbine 73' to the ring 80, it may be desirable in high load environments to have a separate shoulder for each spoke. This type of configuration will insure in-plane longitudinal rigidity and eliminate the need for out-of-plane flexibility of the spokes as they rotate about the ring 80.

A number of helical turns 83' of the endless helical turbine 73' corresponds to the number of shoulders disposed around the ring 80. Impeller blades 84' are formed around the edge of the helical turns 83' so that each of the turns may be driven by fluid forces impinging on the impeller blades. At the inner diameter of the toroid the impeller blades 84' are closely packed, so that the maximum blade area is exposed to incoming gas flow through the orifices 128. A stator 85 is passed over a sector of the helical element 83' outwardly of the ring 80 as illustrated. The stator has helical grooves 86 formed therein, the number of grooves corresponding to the number of helical turns 83' of the endless helical turbine 73'. One side wall 86 of the groove 83 is shown in FIG. 12. As shown, the groove overlaps the helical turn 83'. The stator halves are held together by pins 93 in ribs 94. The stator thereby guides the endless turbine for rotation along the ring 80 as the endless turbine is rotated about the ring. The stators and turbine blades are cooled by air flowing through the annular ducts 135. Cooling air may be obtained from an auxiliary supply, not shown, or bled from the compressor as desired.

The power output section 72 basically consists in the contemplated embodiment of the invention simply as a ring gear 88 having outside gear teeth 89 formed thereon. The outwardly projecting section of connecting arms 82 are joined to the ring gear as by welding so that the ring 80 and ring gear 88 form a unitary structure. In the preferred embodiment, additional support for ring gear 88 is provided by a ball bearing assembly 90 by means of which stator 85' cooperate with the ring 88, as illustrated. The gear teeth 89 may cooperate with any appropriately spaced gear teeth (not shown) in order to transmit motion of ring gear 88 to any end device. Since such operation of an end device does not constitute a part of the invention, no illustration thereof has been made.

In another modification, the endless helical turbines 73' may be cut into sectors, each sector to be placed between two contacting arms 82. This type of construction eliminates the necessity of threading the turbine 73' over the connecting arms, which may be, relatively thick in comparison to the thickness of the endless turbine 73'. This construction, however, does not change the mode of operation of the device. In combination all of the sectors operate as if the turbine 73' was endless.

The downstream end of the transmission section 72 opens into an annular passageway 129 formed between the stator 85' and duct 124. This passageway couples the transmission section to a turbine inlet stator section 130 which includes a plurality of guide vanes circumferentially disposed between the duct 125 and outer wall of the housing 119. Gas flowing through the inlet guide vane 130 flows through the compressor drive turbine rotor blades 115 to an exhaust duct 131. The exhaust duct is an annulus bounded by the duct 105 and the outer wall of the housing 104. The concentric disposition of the inlet duct and exhaust duct provide counterflow heating of the inlet air as can be seen by the arrows.

In operation air entering through the air inlet section 95, flows through the inlet duct 105 past the inlet guide vanes 108 to the first stage compressor rotor. The air is compressed in the first stage rotor and flows axially past the first stage stator blade 116. The stator blades redirect the flow of air exiting from the first stage rotor blades 112 to an axial path prior to its entrance to the second stage rotor blades 121. The air leaving the first stage stator flows to the second stage rotor blades 121 where it is compressed further. The compressed air leaving the compressor flows through the duct 124 to the combustion chamber 97. Fuel from a fuel supply not shown is injected into the combustion chamber through fuel nozzles 126 where it is mixed with air flowing therethrough. The fuel-air mixture is ignited by appropriately placed igniters 127 in the combustion chamber. The heated gas flows through orifices 128 where it is expanded to the impeller blades 84' formed in the endless turbine 73'. The high velocity air exiting from the combustion chamber 97 applies a force component tangentially the endless helical curve defined by the endless turbine 73'. The impeller blade 84' and orifices 128 are so disposed in the preferred embodiment, that each helical turn 83' of the turbine is equally loaded. It will be apparent that other means of driving the endless turbine may be used by modifying the apparatus shown, as is known in the art. For example, with slight modification, the turbine could be driven by steam, water, or other fluids. In will also be apparent that the impeller blade need not be disposed about the edge of the endless turbines 73', as shown, but could be placed anywhere along the periphery of the turbine. For example, it may be desirable in certain application, such as a water turbine, to have buckets disposed on the vertical faces of the turbine, rather than on its edges.

In many applications it is desirable that all the helical turns be driven simultaneously by the high velocity gases. However, if desired all the turns need not be driven simultaneously. Simultaneously drive is preferable in that the input load to the endless turbine is equally distributed amongst the helical turns 83'.

As the endless turbine 73' rotates it is guided through the helical groove 86 in the stator 85'. As the turbine 73' is guided through the grooves 86 it bears on the forwardmost (relative to its direction of travel) walls 87 of the grooves 86 which act as a wedge relative to the flat surface of the turbine. This wedging force is transmitted to the radially disposed shoulders 81 on the ring 80 through the turbine 73', causing the ring 80 to rotate in the direction of the arrow M. The ring gear 88 is connected to the ring 80 through the connecting arms 82 and rotates with ring 80 thereby providing a suitable transmission for coupling to an output load.

The gas leaving the endless turbine 73' flows through the turbine inlet guide vanes 130 to the turbine rotor blades 115. The turbine rotor blades are mounted in the ring 114 which in turn is coupled to the first stage compressor rotor, whereby rotation of the turbine rotor blades causes the first stage compressor rotor to rotate. The second stage compressor rotor is driven by the first stage rotor through the shaft 109 and face plines 123. Gas leaving the compressor drive turbine flows through an exhaust duct 131 to the atmosphere.

As is true with the gear reducer in FIG. 9 and 10, the turbine illustrated herein is not limited to circular devices as illustrated in FIG. 12, but is broadly applicable to closed curves other than circles. In order to adapt this device for other curves it may be desirable, for example, to make the ring 80 and the pickoff device or gear 88 non-rigid, thereby to allow motion along any desired shape of curve.

There has been described hereinbefore a new and improved reelless tape recorder in which the complex mechanism associated with tape recorders using reels has been eliminated. Since the magnetic head in the recorder and tape are relatively moveable in the direction transverse to the edges of the tape, random access may be had to previously stored data. Random access has heretofore been unobtainable in tape devices known in the prior art. In addition, since the magnetic tape is in the form of an endless helical curve a continuous recording is possible for extended periods without requiring rewinding or reversal of the tape.

The novel drive mechanism discussed hereinbefore has broad application to many devices; the tape recorder, gear reducer, and turbine, being but a few examples. The broad concept of a kinematic linkage that is in the form of an endless helical curve whereby two degrees of rotation is obtained from a single degree of rotation input has many applications, only a few of which have been described hereinbefore.

While there has been described what are at present considered to be the preferred embodiment of this invention, it will be obvious to those skilled in the art that various changes and modifications may be made therein without departing from the invention, and it is, therefore, aimed in the appended claims to cover all such changes and modification as fall within the true spirit and scope of the invention.

What is claimed is:

1. A reel-less recorder, comprising:
a case;
supporting means for translating sound to recordable signals; and
means cooperating with said first named means to store the recordable signals, including an endless recording medium, the recording medium being self supporting in the configuration of an endless helix about a helix axis forming a closed loop, said helix having a toroidal envelope whose central axis is transverse to said helix axis.

2. A magnetic recorder, comprising:
means including a microphone to translate sound into electromagnetic signals;
means cooperating with the first-named means to store the electromagnetic signals including a magnetic recording head and an elongated magnetizable recording medium, the elongated magnetizable recording medium being first disposed in the form of a helix having a plurality of turns and two free ends and then the two free ends being joined to form an endless helix wound about a closed loop axis and having the general overall configuration of a toroid, one turn of the toroid being adjacent the magnetic head in operative relationship thereto; and
means for driving each point on the elongated magnetizable recording medium past the magnetic head, the last-named means including a rotating member contacting one portion only of more than one half the turns of the helix whereby each point on the elongated magnetizable recording medium is caused to precess past the magnetic recording head.

3. A magnetic recorder as in claim 2, wherein the elongated magnetizable recording medium is an edge-coiled tape having its wider surface oriented transversely to said axis, having at least one of its wider surfaces magnetizable and having at least one of its edges serrated to form gear teeth therein and the rotating member includes a spindle having a spiral gear formed thereon to match the gear teeth on the elongated magnetizable recording medium, the spiral gear being disposed in the opening of the toroid.

4. A magnetic recorder, comprising:
a case supporting a motor;
a spirally geared spindle affixed to the rotor of the motor, and projecting therefrom;
an endless magnetic tape geared to the spindle, the tape being in the form of an edge-wound helix with the ends thereof turned back and joined one to the other to form an endless helix wound about a circular axis concentric with said spindle, whereby said helix has the general overall configuration of a toroid whose central axis is parallel with the spindle with the individual turns of the so-formed toroid being substantially radial to the spindle, the edge of said tape disposed farther from said circular axis having tooth-like projections engaging said spindle;
a magnetic recording head disposed adjacent one wider surface of the magnetic tape at a point outwardly removed from the spindle;
means for translating sound into electromagnetic signals at the recording head;
means for periodically energizing the motor to rotate the spindle and cause the toroid to rotate about said circular axis and precess past the recording head; and
means for moving the recording head radially in synchronism with the rotational and precessional movement of the magnetic tape so as to allow more than one channel of information to be recorded on the magnetic tape.

5. A data processing medium, comprising:
a carrier tape helically wound about a closed curve, with its flat surfaces in juxtaposition, said helix being endless and having said curve as its axis; and
a data processing means coupled to at least one of said carrier tape flat surfaces for providing said data processing medium.

6. A data processing medium, comprising:
a carrier tape helically wound about a closed curve with its flat surfaces in juxtaposition, said helically wound tape being endless and having said curve as its helix axis, said tape having an outer edge furthermost from said curve which alone defines a toroidal envelope for said helix, said toroid having a central axis transverse to said helix axis;
a data processing means coupled to at least one of said carrier tape flat surfaces for providing said data processing medium; and
means adapting said tape to be driven at its periphery.

7. A data processing medium, comprising:
a carrier tape helically wound about a curve with its flat surfaces in juxtaposition, said helically wound tape being endless and having said curve as its helix axis, said tape having an outer edge furthermost from said curve which defines a toroid whose central axis is transverse to said helix axis;
data processing means coupled to at least one of said carrier tape flat surfaces for providing said data processing medium; and
means for driving said tape at its edges, including a serration formed in said edge adapted for driving said tape by the application of a force component tangential to said edge.

8. A data processing medium, comprising:
a carrier tape helically wound about a closed curve with its flat surfaces in juxtaposition, said helically wound tape being endless and having said curve as its helix axis, said tape having an outer edge furthermost from said curve which defines a toroid whose central axis is transverse to said helix axis;
data processing means coupled to at least one of said carrier tape flat surfaces for providing said data processing medium; and
means for driving said tape including a plurality of gear teeth disposed along said tape for intermeshing with a geared rotatable driving member.

9. A motion transducer, comprising:
an endless linkage means, having a member formed substantially in the shape of an endless helical curve having a closed loop axis and on the whole having a toroidal shape with a central axis transverse to said closed loop axis, said means being capable of producing curvilinear motion along said curve in response to a force component applied to said member tangentially to said curve; and
driving means coupled to said linkage means for providing said force component, thereby, to provide said motion transducer.

References Cited by the Examiner

UNITED STATES PATENTS

| | | | |
|---|---|---|---|
| 730,964 | 6/1903 | Prestwich | 88—18.8 |
| 2,990,182 | 6/1961 | Cailliot | 274—4 |

FOREIGN PATENTS

| | | |
|---|---|---|
| Ad. 73,415 | 7/1960 | France. |
| 1,215,527 | 11/1959 | France. |

IRVING L. SRAGOW, *Primary Examiner.*

DAVID G. REDINBAUGH, BERNARD KONICK, *Examiners.*